Oct. 20, 1931.     H. C. FORD     1,827,812
RANGE AND BEARING KEEPER
Original Filed March 1, 1919     9 Sheets-Sheet 1
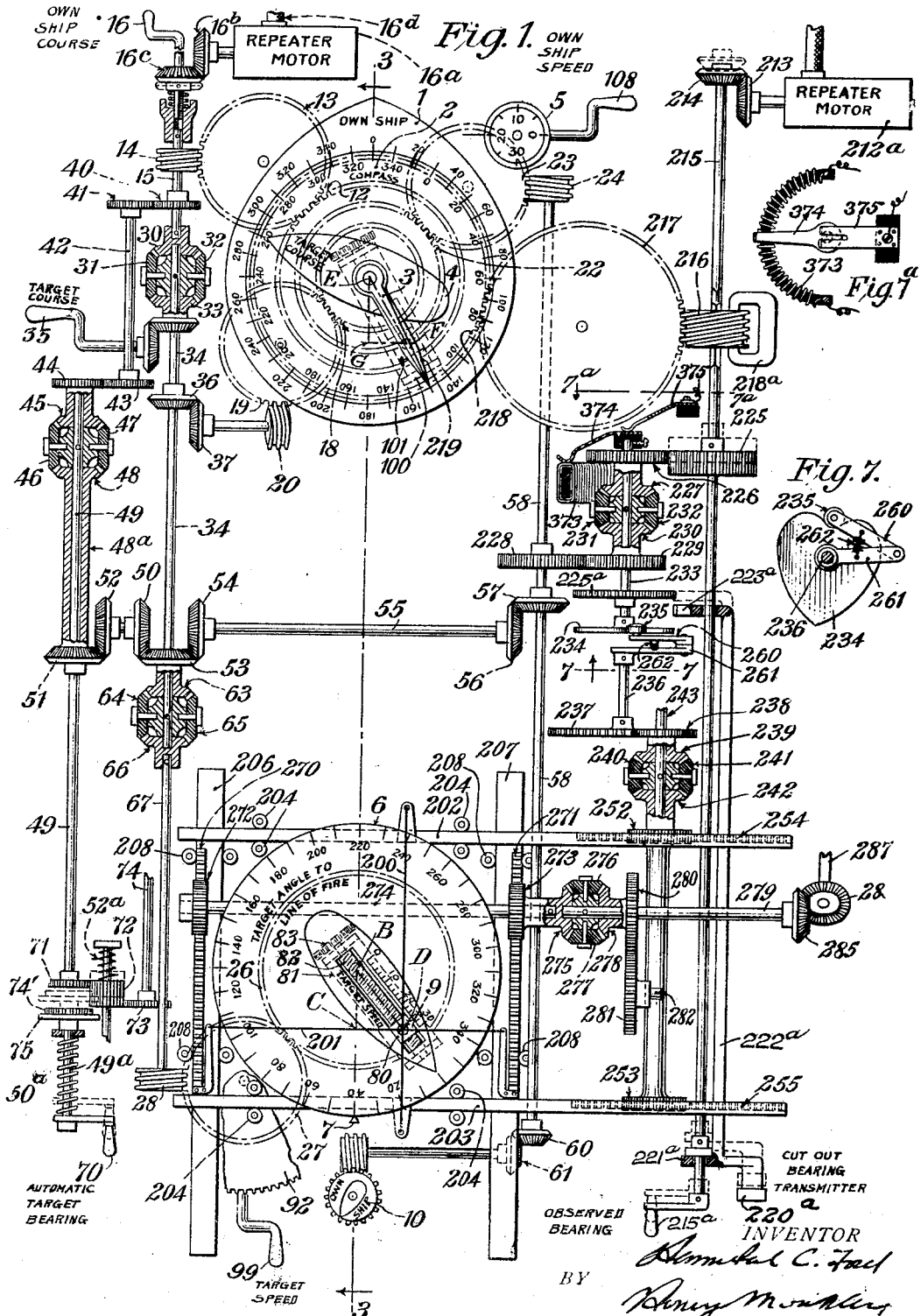
INVENTOR
BY
ATTORNEY

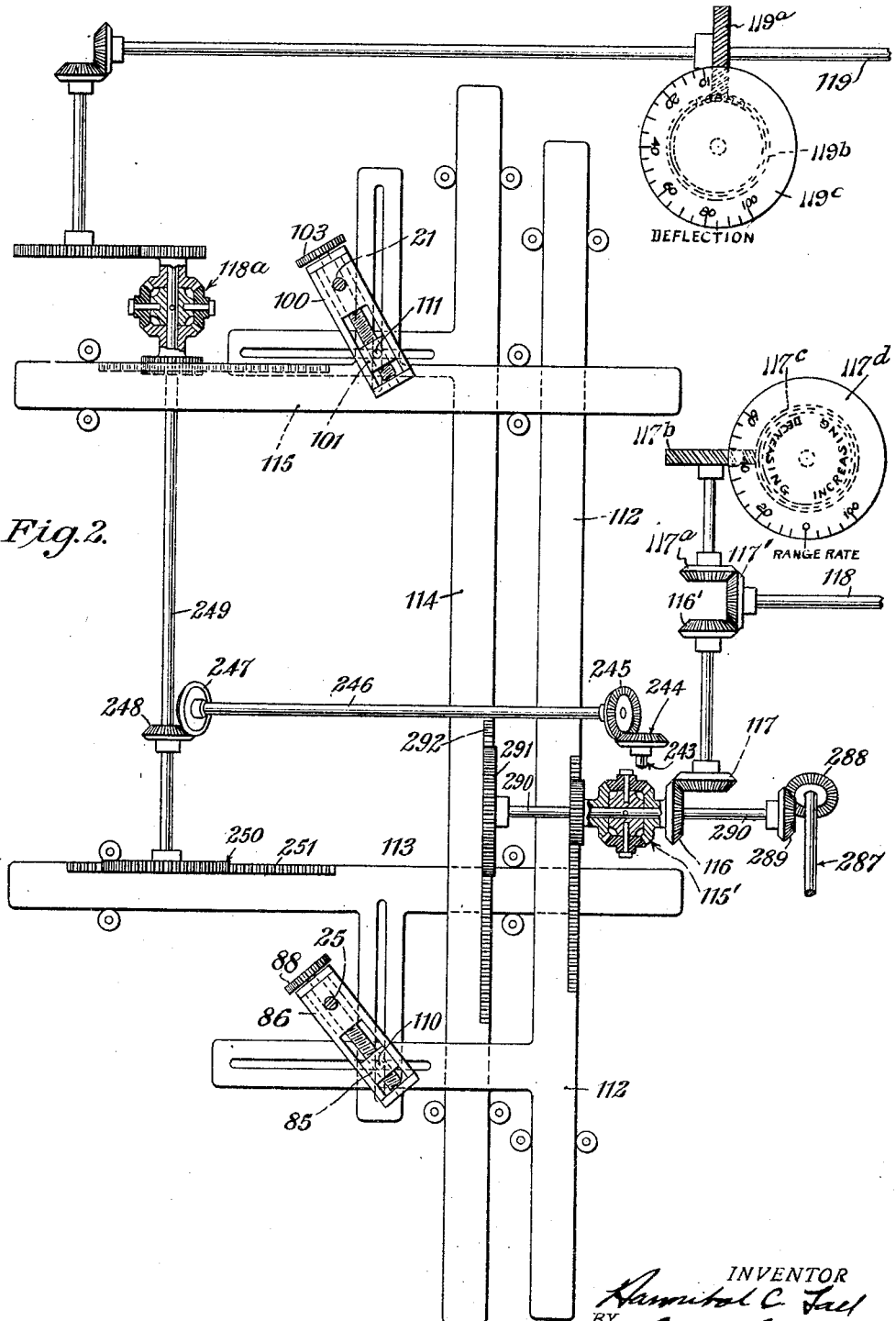

Oct. 20, 1931. H. C. FORD 1,827,812
RANGE AND BEARING KEEPER
Original Filed March 1, 1919 9 Sheets-Sheet 3
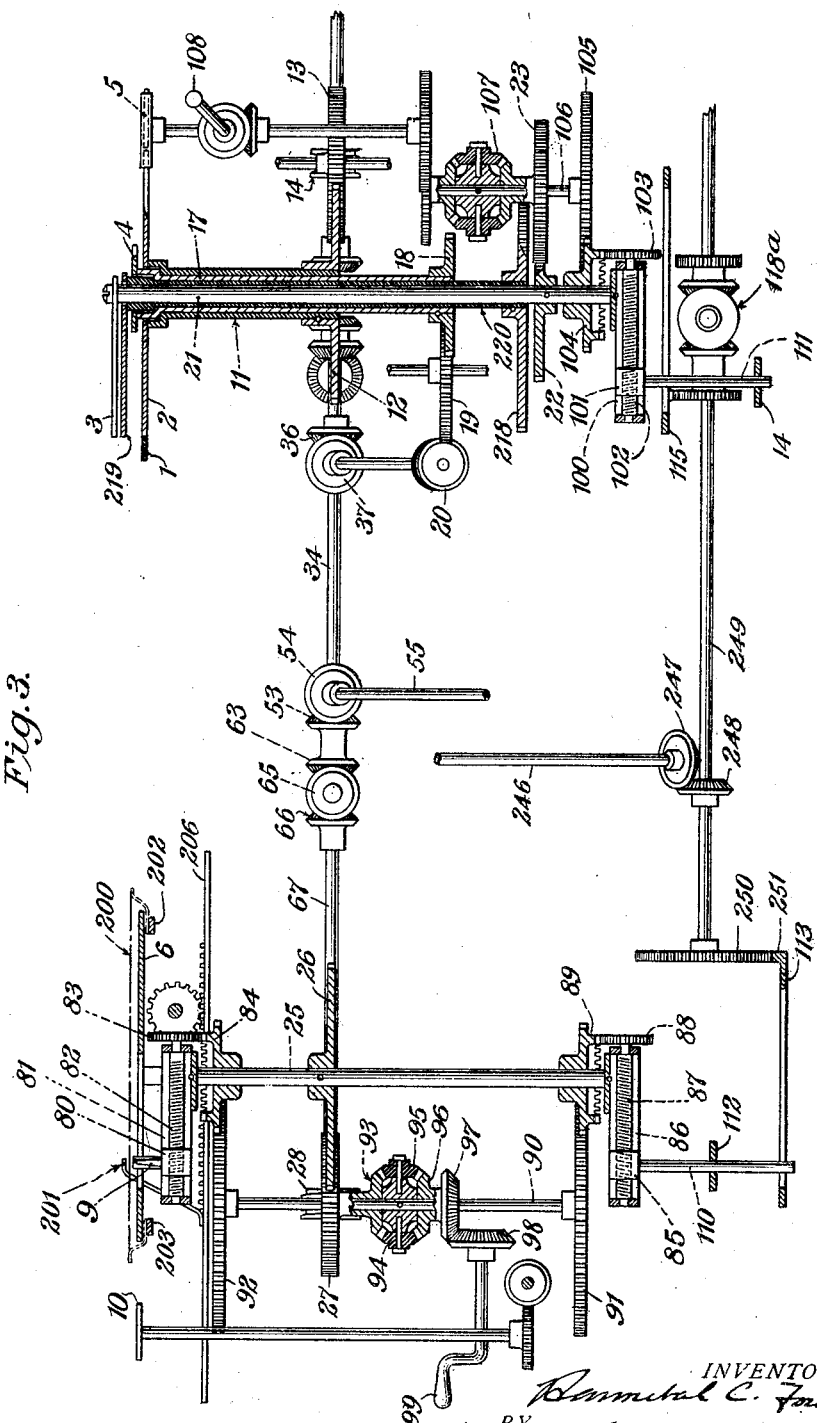

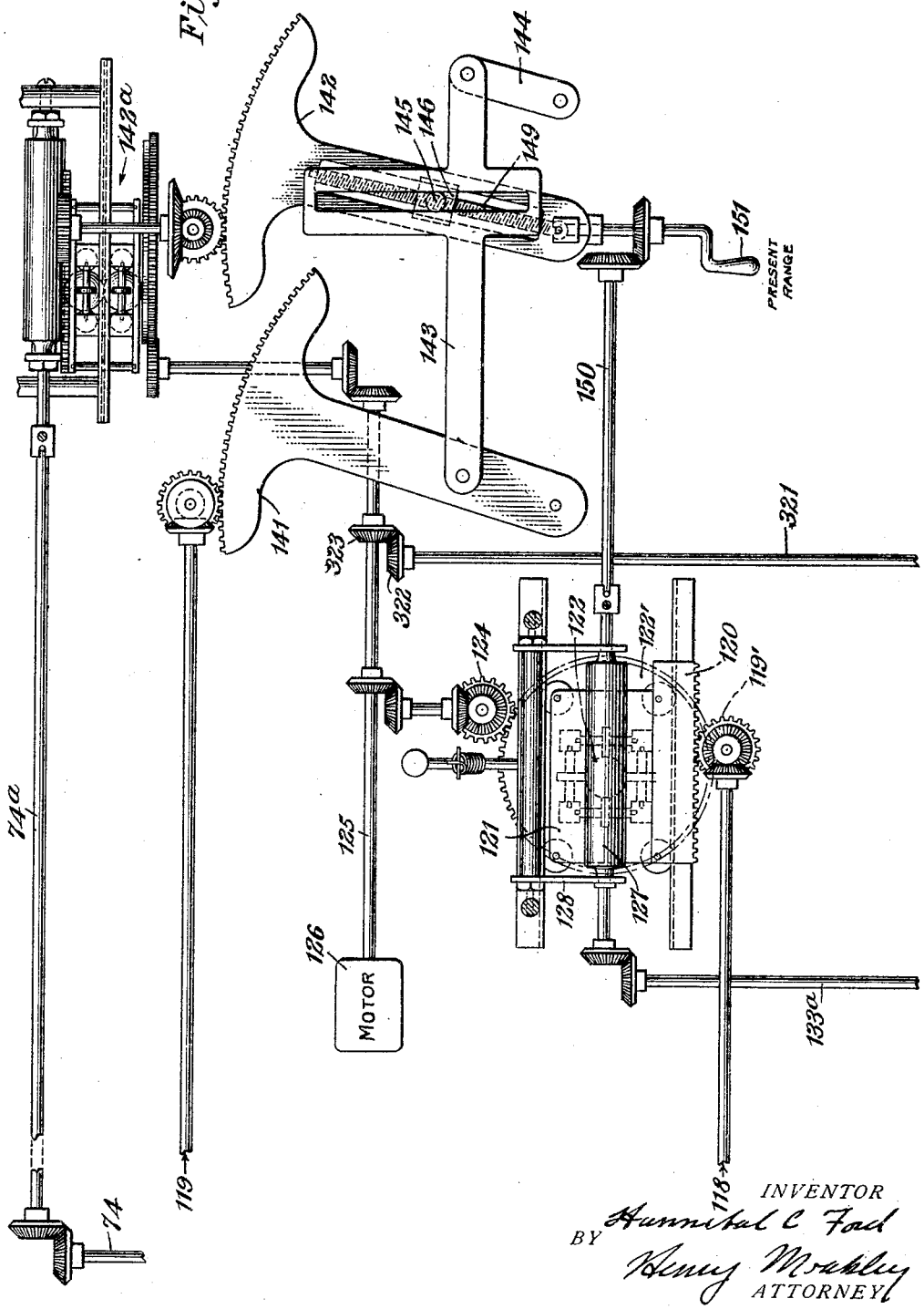

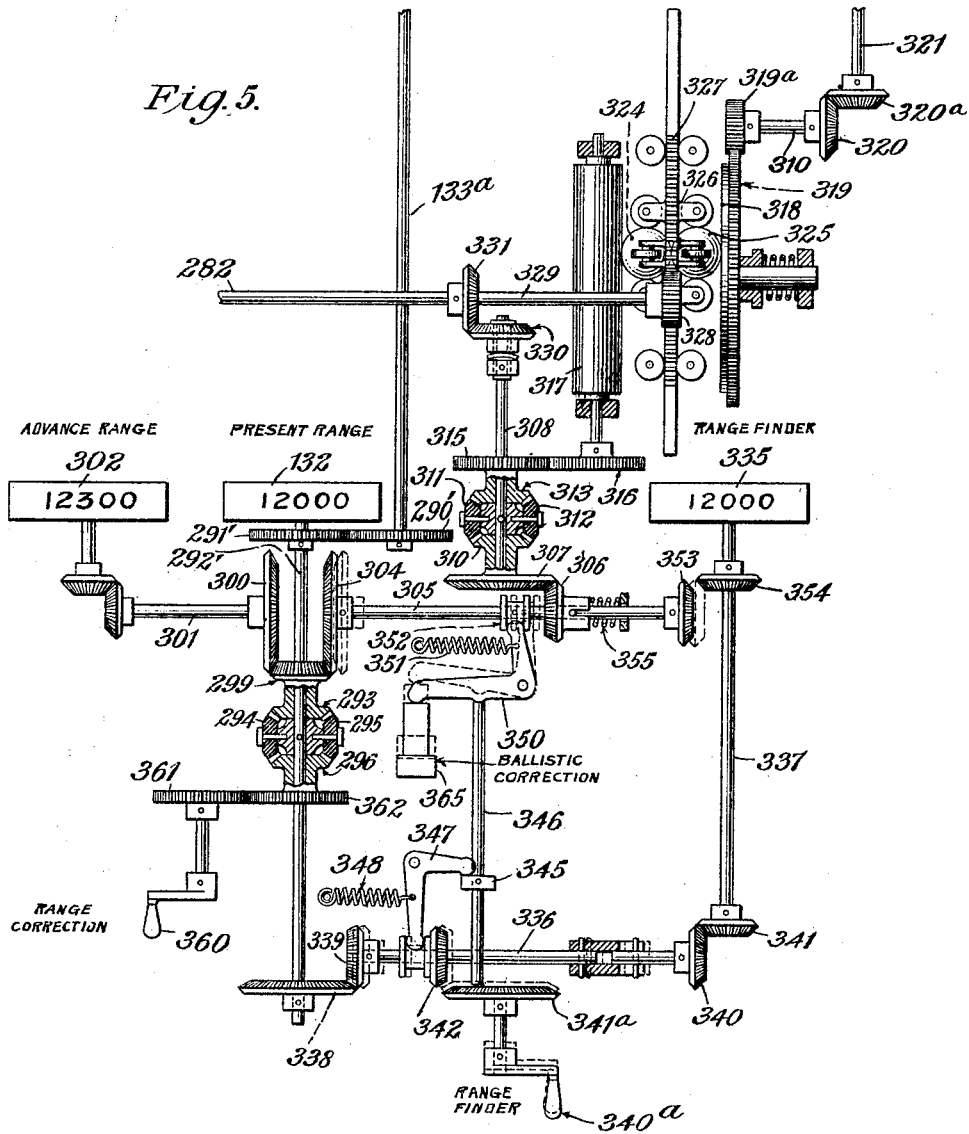

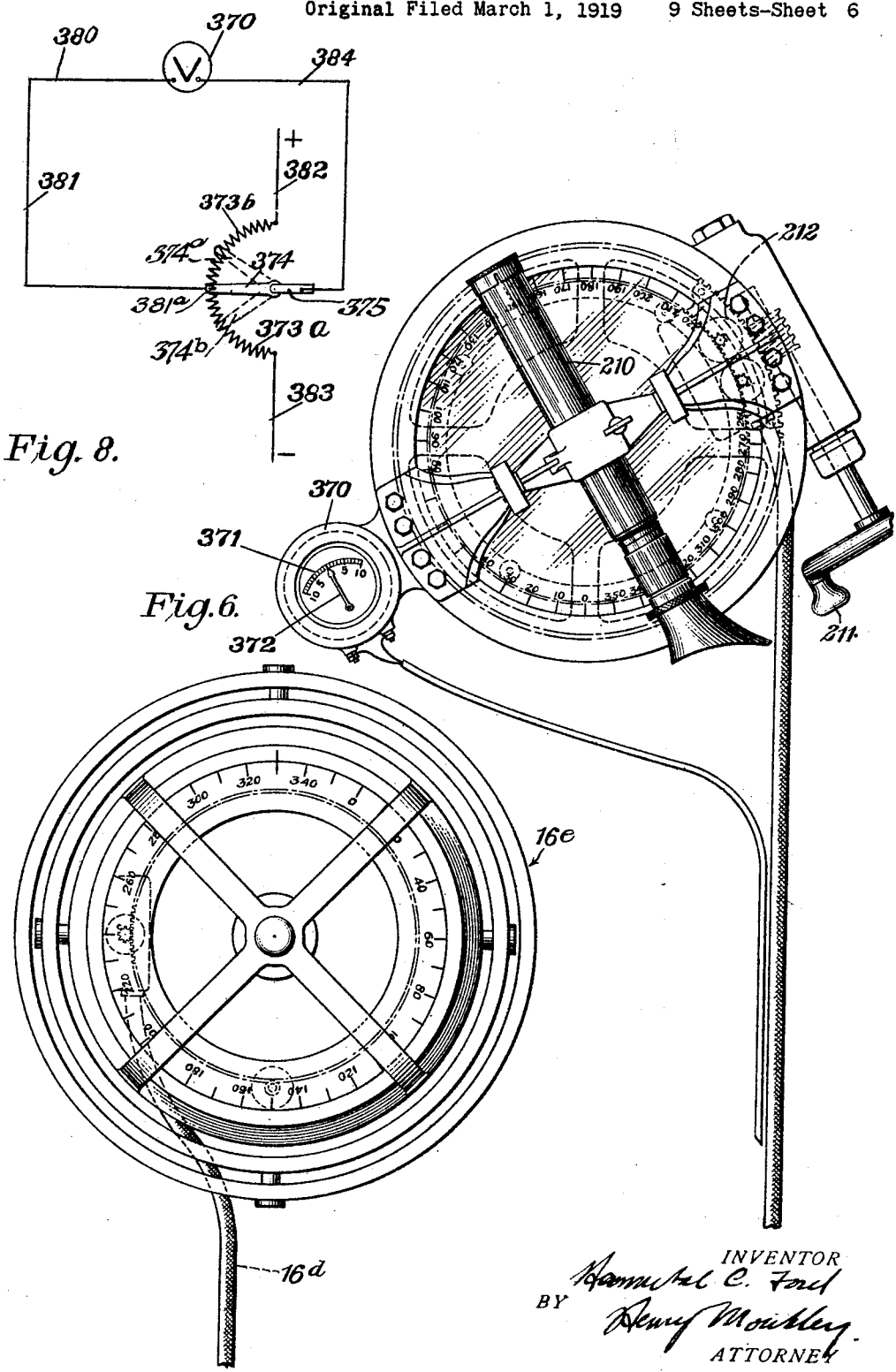

Oct. 20, 1931.  H. C. FORD  1,827,812

RANGE AND BEARING KEEPER

Original Filed March 1, 1919  9 Sheets-Sheet 7

Hannibal C. Ford, Inventor

By his Attorneys

Moakley and Gill

Oct. 20, 1931.   H. C. FORD   1,827,812
RANGE AND BEARING KEEPER
Original Filed March 1, 1919   9 Sheets-Sheet 8

Oct. 20, 1931.           H. C. FORD            1,827,812
                    RANGE AND BEARING KEEPER
            Original Filed March 1, 1919    9 Sheets-Sheet 9

INVENTOR
Hannibal C. Ford
BY Moakley & Gill
ATTORNEYS.

Patented Oct. 20, 1931

1,827,812

UNITED STATES PATENT OFFICE

HANNIBAL C. FORD, OF JAMAICA, NEW YORK, ASSIGNOR TO FORD INSTRUMENT COMPANY, INC., OF NEW YORK, N. Y., A CORPORATION OF NEW YORK

RANGE AND BEARING KEEPER

Application filed March 1, 1919, Serial No. 280,150. Renewed November 19, 1925.

This invention relates to range and bearing keepers and more particularly to an instrument of this character which is utilized on board ship to maintain the range and bearing between two moving ships.

One object of the invention is to generate the range between two moving ships or objects from mechanical vectors representing the course and speed of the two objects, which vectors are resolved into their range and deflection components and the range and bearing are generated from these components by variable speed mechanisms.

Another object of the invention is to provide means for indicating the correct course and speed of one of the moving objects, i. e., the target, so that the vector representing the target's course and speed may be accurately determined in order to accurately generate the range and bearing. As is well known, the actual bearing between two moving objects may be obtained with accuracy by means of a target bearing telescope. The actual range between the two ships or objects may also be accurately obtained with range finders and by "spots" which are estimates of the range obtained by judging the distance which a projectile misses a target. The actual range and bearing obtained in this manner are resolved by suitable mechanism into the components which are affected by the movement of the ship and the components which are affected by the movement of the target. These components are then utilized to indicate what is the correct course and speed of the target, and thereby obtain a check upon the estimated course and speed of the target, initially utilized to set the instrument.

In the drawings one embodiment of the invention is disclosed which will serve to illustrate the invention, the drawings being diagrammatic for the purpose of more clearly disclosing the invention.

Figure 1 shows in plan "Own Ship's" dial and the target dial and associated parts.

Figure 2 shows the mechanical vectors and slides for determining the range rate and deflection.

Figure 3 is a section through Fig. 1 upon the line 3—3 to show the arrangement of dials and vectors.

Figure 4 shows the mechanism for generating the bearing and range.

Figure 5 shows the mechanism for comparing the actual and generated range.

Figure 6 shows in plan the gyro compass and target bearing telescope, which are connected to the repeater motors shown in Fig. 1.

Figure 7 is a detail section taken on the line 7—7 of Fig. 1.

Figure 9:
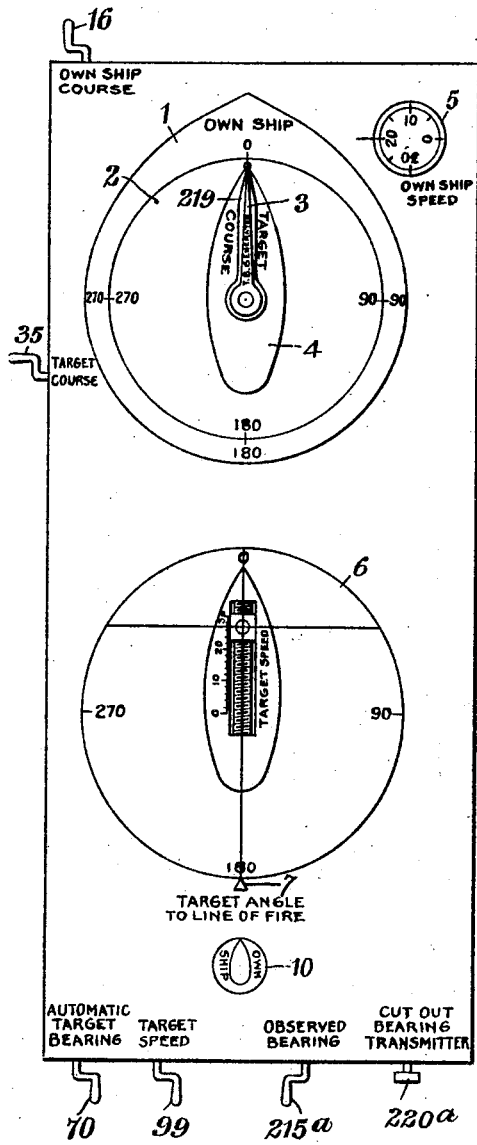
Figure 10:
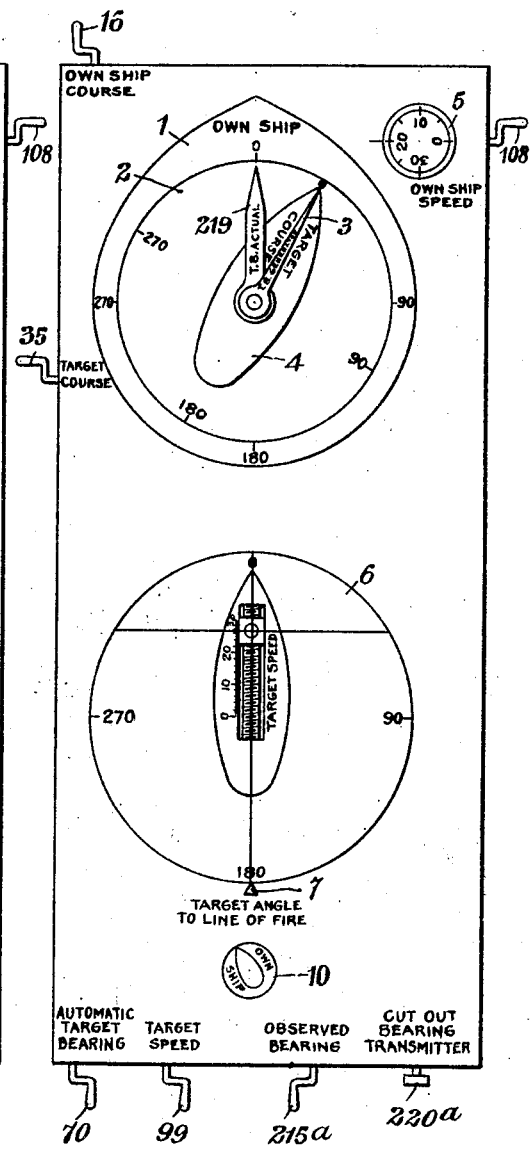
Figure 11:
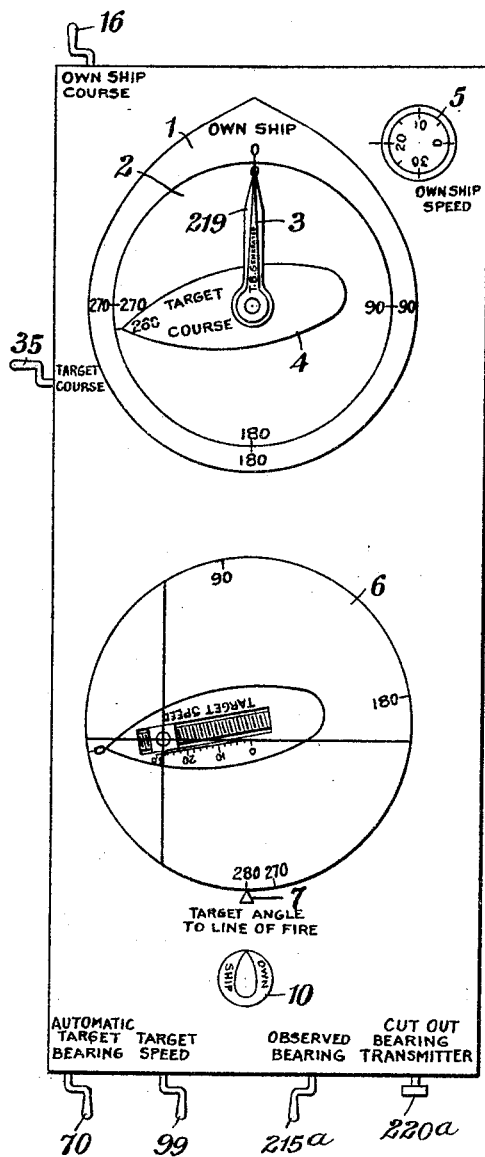
Figure 12:
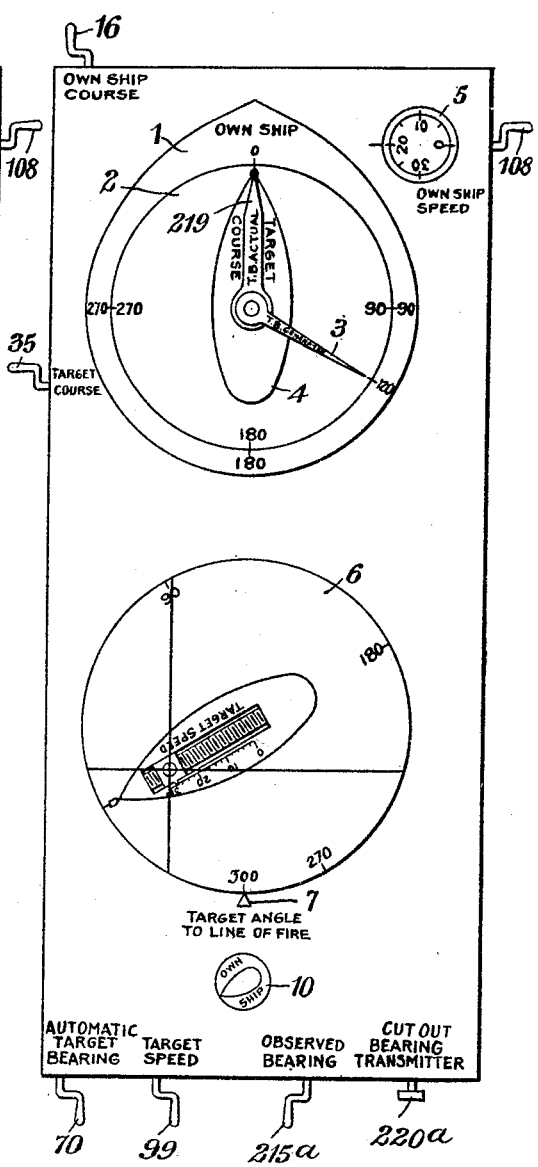
Figure 13:
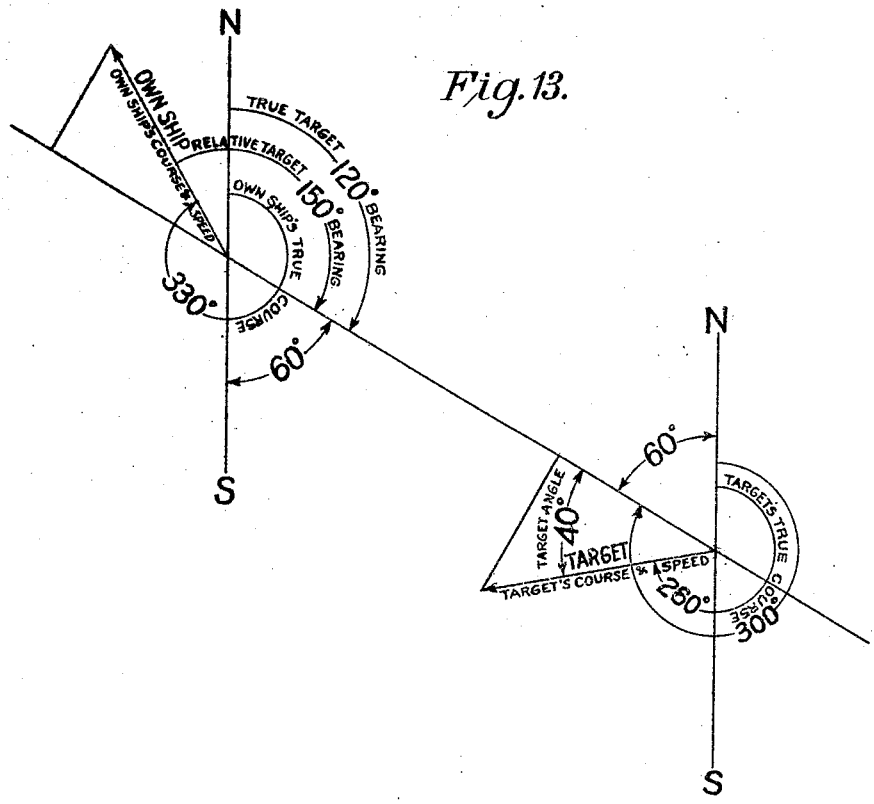

Figure 7ª is a detail section taken on the line 7ª—7ª of Fig. 1,

Figure 8 is a diagram of the electrical corrections,

Figure 9 is an external view of the instrument showing all of the dials set at zero, Figure 10 is a similar view showing the effect of a change of "Own Ship's" course on the setting of the dials, Figure 11 is a corresponding view showing the effect of a change of "target's" course on the setting of the dials, Figure 12 is a similar view showing the effect of a change of target bearing on the setting of the dials, and Figure 13 is a diagram illustrating the relations of Own Ship and the target with reference to their respective courses and to each other.

Referring first to Fig. 1, the arrangement of dials shown in this view is similar to that shown in my copending application for a range and bearing keeper, Serial No. 240,883, filed June 19th, 1918, now Patent No. 1,450,585 the preferred arrangement of dials being the same and consisting of fixed ring or angular dial 1 marked "Own Ship" and having an azimuth scale whose zero line defines the fore and aft line of the ship. The relative bearing of the target and the relative course of the target are read from this dial, as will be hereinafter described. Rotatably mounted within the "relative bearing" dial 1 is a "compass dial" 2 which is also provided with an azimuth scale. A target bearing pointer 3 is mounted coincidentally with the center of the compass dial 2 and the true target bearing is read on the compass dial 2 opposite the end of the pointer, and the relative target bearing or the angle between the line of sight and "Own Ship's" bow is read from the "relative bearing" dial 1. The true course of "Own Ship" is read from the compass dial 2 opposite the zero of the "relative bearing" dial 1.

Also mounted conincidentally with the pointer 3 is a pointer 4 which is utilized to indicate the direction or course of the target, the true course being read from the compass dial 2 and the relative course being read from the dial 1. A small dial 5 indicates the speed of "Own Ship" and will be later referred to. A dial 6 hereinafter referred to as the "target dial", indicates the angle which the target course makes with the line of fire or sight which is read off the azimuth scale upon this dial opposite the lubbers line 7. This dial also carriers a movable pointer 9 which is set to the estimated speed of the target upon the speed scale adjacent to it as will be later referred to.

A small dial 10 is utilized in combination with the target dial 6 indicating the position of "Own Ship" with respect to the target and for this purpose carries a figure or representation of a ship as does also the target dial.

Referring now to Fig. 3, the relative bearing dial 1 is fastened permanently in the instrument by a construction not shown. The compass dial 2 is mounted upon a sleeve 11 which carries a gear 12 shown in dotted line in Fig. 1. The gear 12 meshes with the gear 13 which may be actuated by a spiral gear 14 carried by a shaft 15. A handle 16 is shown attached to this shaft for rotating the gear 14. A repeater motor 16a is also shown connected to this shaft by gears 16b and 16c, which repeater motor is connected by a cable 16d to a gyro compass 16e shown in Fig. 6. The repeater motor 16a may be similar to the ones at present utilized for driving repeater compasses connected to a "master gyro compass."

The target course pointer 4 (see Fig. 3.) is mounted upon a sleeve 17 within the sleeve 11, which sleeve carries at its lower end a gear 18 which is actuated by gears 19 and 20. The target bearing pointer 3 is mounted upon a shaft 21 which carries a gear 22 at its lower end actuated by gears 23 and 24 (see Figs. 1 and 3.) The target dial 6 is carried by a shaft 25 which is actuated by a gear 26 which is driven by gears 27 and 28.

The arrangement of dials and pointers shown is utilized in setting up the course of "Own Ship" and the estimated course of the target, the interconnection between the dials and rotatable pointers being disclosed in Fig. 1, and it is believed that the construction of the parts may be most clearly explained by describing their operation. Before proceeding to such description, however, it will be advantageous to consider the actions of the dials and pointers and their relations to each other and to the geographical conditions with which they deal.

As an assistance to the understanding of the actions of the target dial 6, the diagram of Fig. 13 shows the geographical relations of Own Ship and a target with reference to North and South lines N—S, as well as the relaton of Own Ship and the target to each other. In the interests of orderly procedure, the dials and pointers are placed in the "standby position" shown in Fig. 9. Figs. 10, 11 and 12 serve to give a clearer comprehension of which dials and pointers have simultaneous actuation during different settings. For example, Fig. 9 shows the dials and pointers set at zero, and, in this connection it is pointed out that the zero of the target dial graphically indicates the zero position of the target dial 6 in the sense that, in Fig. 9, it lies on an imaginary line which extends through the centers of Own Ship dial 10 and the target dial 6, this line being representative of the line of sight between Own Ship and the target. Since, as will be understood from the diagram of Fig. 13 at such times as the target's course is coincident with the line of sight, there is no target angle between the target's course and the line of sight, the zero position of the target dial 6 in Fig. 9 indicates such zero or absent target angle.

Fig. 10 clearly shows that the setting of Own Ship's course results in the coincident movement of the compass dial 2, the target bearing pointer 3 and the target course pointer 4, but no movement of the target dial 6.

Rotation of a crank 35, however, causes the turning of the target course pointer 4 with respect to the compass dial 2, as shown in Fig. 11, indicating the target's course on this dial. The target dial 6 is correspondingly actuated, visually indicating the target angle, which is read against the lubbers line 7 as will be better comprehended from subsequent explanation.

It is evident from Fig. 12 that the dial 6 is additionally actuated simultaneously with the setting of the target bearing pointer 3, and reference to Fig. 1 and the diagram will afford a comparison of the geographical conditions and their representation by the dials and pointers of the instrument.

Assuming that the dials and pointers are positioned as shown in Fig. 9, it will be comprehended that in Fig. 1, the zero mark of the target dial 6 will be where graduation 220° of dial 6 is now shown in the latter figure. If the target course pointer 4 be now turned clockwise from the zero mark of the compass dial 2 to the 260° graduation on the dial 2, the zero mark of the dial 6 will move from the position in Fig. 1 which is there occupied by the 220° graduation to a position in that figure which corresponds to that which is occupied by the graduation 120° on compass dial 6. This will now be demonstrated.

Inasmuch as the dial 6 in the drawings must remain in its drawn position, and cannot be rotated with respect to the index 7, the 220° graduation must, for the purposes of demonstration, be temporarily regarded at the outset as the zero mark. The 260° clockwise rotation of the target dial 6, resulting from the 260° rotation of the target course pointer 4, may be arithmetically added to the 220° graduation, (which is now being regarded as the zero graduation of the dial 6), and the sum will be 480°. Of course, the actual rotation is only 260°, which is not really added to a movement of 220° but to that number as the temporarily enforced representation of the zero graduation. From the erroneous rotational total of 480° may be subtracted the number of actual degrees in a circle, obtaining the following result, 480°−360°=120°. The graduation on the target dial 6 which is marked 120 is exactly 260° from the graduation on that dial which is marked 220°. This proves that actually the real zero mark of the real dial 6 in moving 260° from the graduation 220° will come to rest at what is shown as the 120° graduation in Fig. 1.

Mentally retaining this proved conclusion, let it be remembered that the target dial 6 is also responsive to changes in the position of the target bearing pointer 3. This pointer is shown in Fig. 1 to read against the graduations of compass dial 2 to show a true target's bearing of 120° and a relative target's bearing of 150°, which corresponds to what is shown in the diagram of Fig. 13. It is only necessary to consider, one of these values, say, the true target's bearing of 120°.

When the target bearing pointer 3 moves clockwise through 120°, the target dial 6 turns counter clockwise for 120°. Therefore, 120° is subtracted from the graduation 120 on the target dial 6. In other words, the dial 6 is turned back counter clockwise 120°. Then its 120° graduation, which really represents the zero mark of the dial 6, after this dial has moved clockwise 260° from the 220° graduation shown in Fig. 1, as described, will now be at the zero mark of the dial 6, as shown in Fig. 1.

By the above method of placing the zero mark of the target dial 6 at differently numbered graduations on that dial as it is shown in Fig. 1, the positioning of the zero mark of the target dial 6, as a result of the setting of the target course pointer 4 and the target bearing pointer 3 has been demonstrated.

The accuracy of the result is proved by a comparison of Fig. 1 with the diagram of Fig. 13. Thus, reading the zero mark of Own Ship's dial 1 against the graduations of the compass dial 2, Own Ship's course is found to be 330° in azimuth, as it is shown to be in the diagram of Fig. 13. In Fig. 1, the target course pointer 4 reads against the graduations of the compass dial 2, showing that the target's true course is 260° as is also shown by the diagram of Fig. 13. The true target's bearing is found in Fig. 1 by reading the target bearing pointer 3 against the graduations of the compass dial 2 which shows the true target bearing to be 120° in azimuth as does the diagram of Fig. 13. Reading the target bearing pointer 3 against the graduations of Own Ship's fixed ring dial 1 shows the relative target bearing to be 150° in azimuth, which corresponds to what is shown in Fig. 13.

In Fig. 1, the target dial 6 reads against the lubber's line 7 to show the target angle that the target's course makes with the line of sight from Own Ship to the target is 40°, as it is shown to be in the diagram of Fig. 13. The action of the dials and pointers having now been outlined and their reproduction of the actual conditions having been shown, the detailed description of the parts and their actuation may be resumed.

To set up the course of "Own Ship" either the handle 16 is actuated or the shaft 15 is driven by the motor 16a through the gears 16b and 16c. In the manual operation of the dial 2 the handle 16 is pressed inwardly which will disconnect the gears 16b and 16c connected to the repeater motor of the gyro compass. In the normal operation the repeater motor is connected and the shaft 15 driven therefrom. The rotation of the shaft 15 will through the rotation of the gears 13, 14 and 12 actuate the compass dial 2 so that the true course of "Own Ship" is automatically set up on the instrument. The rotation of the shaft 15 also actuates a differential consisting of gears 30, 31, 32 and 33, the shaft 15 being connected to the gear 30 and the gears 31 and 32 being connected to the spider which is fastened to a shaft 34. The gear 33 is normally held stationary to a target course setting crank 35, which must be rotated in order to rotate the gear 33 through the bevel gears shown. When, therefore, the gear 30 is actuated the centre of the differential and gears 31 and 32 will rotate the shaft 34 and through bevel gears 36 and 37 actuate the gear 20 which in turn will through gears 19 and 18 rotate the target course pointer 4 a similar amount to the compass dial 2 or, in other words, the rotation of the compass dial 2 will cause a corresponding rotation of the target course pointer 4, so that the relative position of these two parts will not be varied and the target course pointer will continue to indicate the true course of the target upon the compass dial even though the course of "Own Ship" may be varied. The relative course of the target with respect to "Own Ship's" bow will, however, be varied and will be read off the scale on the dial 1 opposite the pointer 4. The target bearing pointer 3 is also actuated when the course of "Own Ship" is changed, i. e., when the compass dial 2 is rotated. For this purpose the shaft 15 carries a gear 40 which meshes with a gear 41 mounted upon a shaft 42. The shaft 42 carries a gear 43 which meshes with gear 44 carried by a sleeve which also carries a gear 45 forming part of a differential, the other gears of which are 46, 47, and 48. The gears 46 and 47 constitute the centre of the differential and their spider is fastened to a shaft 49. The shaft 49 is normally held against free rotation so that the gears 46 and 47 of the differential merely serve to transmit the rotation of the gear 45 to the gear 48 which gear is carried by a sleeve 48a, which also carries the bevel gear 51 which meshes with the bevel gear 52 to drive bevel gear 50 which meshes with gear 53 which in turn meshes wih gear 54 to actuate the shaft 55, which through bevel gears 56 and 57 drives the shaft 58 to actuate the gears 24, 23 and 22 to rotate the target bearing pointer 3. The gear ratios to the target bearing pointer 3 are such that when the dial 2 is rotated the target bearing pointer 3 will be rotated a corresponding amount, so that the relative positions of the pointer 3 and dial 2 will not be changed. Therefore, the pointer 3 will continue to indicate the true target bearing upon the compass dial 2 but will also indicate the relative target bearing upon the dial 1, which will of course vary when the course of "Own Ship" is changed.

The shaft 58 through the gears 60 and 61 will drive "Own Ship" dial 10, the gear ratio here being such that the angular displacement will equal the displacement of the dial 2.

The dial 6 is not affected by the rotation of the compass dial 2. This is true because the gear 53, is connected by a sleeve to a gear 63 which with the gears 64, 65 and 66 constitute a differential, the centre gears 64 and 65 being fastened to a spider which is carried by and attached to the shaft 34. The gear 66 is fastened to a shaft 67 which carries the gear 28, which drives gears 27 and 26 and consequently the target dial 6. As is well known, the rotation of the shaft 15 will cause the shaft 34 to be driven at one-half the speed of the shaft 15, since it is connected to the centre of the differential and the gear 33 is stationary. The shaft 15 also drives the gear 63 at the same speed as the shaft 15 and, since the shaft 34 is connected to the gears 64 and 65 forming the centre of the differential, the rotation of the centre of the differential is at half the speed of the gear 63 and in the same direction which will cause no movement of the gear 66. The gear 66 will therefore remain stationary and, hence, the target dial 6 will not be rotated.

To set the target course pointer 4 to correspond to the estimated course of a target, the crank 35 is turned which will, since the gear 30 of the differential is held relatively stationary due to its connection with the repeater motor 16a, rotate the centre of the differential consisting of gears 31 and 32 and through the shaft 34 and the gears 36 and 37 drive the target course pointer 4. Since the change in the course of the target does not affect the course of "Own Ship" the compass dial 2 should remain stationary which is the case, since the gear 30 of the differential is not affected by the movement of the centre of the differential, consisting of gears 31 and 32. The target bearing pointer 3 is also not affected by the rotation of the target course pointer 4 because the shaft 15 is not rotated, which shaft through the connection described drives the gears 50, 53 and 54 etc., forming a part of the transmission of the target bearing pointer 3. The rotation of the shaft 34 will however, turn the centre of the differential, consisting of gears 64 and 65 which will in turn drive the shaft 67 through the gear 66 to displace the target dial 6 a corresponding amount to the target course pointer 4.

To manually set the target bearing pointer 3 as for example in the initial setting up of the instrument, the crank 70 is used. This crank is mounted upon a shaft 49a which carries a gear 74' normally out of mesh with upon the shaft 49. When, however, the an idler gear 72 which meshes with gear 71 crank 70 is pressed inwardly against spring 50a to its dotted line position the gear 74' is brought into mesh with gear 72 and the connection between the shafts 49a and 49 is therefore established. Upon this inward movement of the shaft 49a a flange 75 adjacent the gear 74' presses the gear 72 against the tension of a spring 52a to disconnect the gear 72 from gear 73 mounted upon a shaft 74. The shaft 74 is connected to the mechanism for automatically generating the bearing as will be later described. The rotation of the shaft 49 as described will rotate the centre of the differential comprising gears 46 and 47 and, since the gear 45 is relatively stationary due to its connection to the repeater motor 16a, the rotation of the centre of the differential will cause the gear 48 to be rotated, which will drive the target bearing pointer 3 through the transmission consisting of bevel gears 51, 52, 50, 53 and 54, the shaft 55, gears 56 and 57, shaft 58 and gears 24, 23 and 22. The rotation of the shaft 58 will also through bevel gears 60 and 61 drive "Own Ship's" dial 10. The spring 50a surrounding the shaft 49a and the spring 52a will return the crank 70, gear 74' and gear 72 to their normal positions after they have been released. The setting of the target bearing pointer 3 as described also moves the target dial 6 because, since the shaft 34 remains stationary, the rotation of the gear 63 will drive the gear 66 and, hence, the shaft 67 will transmit its movement to the target dial 6.

As shown in Fig. 9, the normal or stand-by position of the instrument is with the 180° division of the target dial 6 opposite the pointer 7. The reason for this will appear from a consideration of the geographical diagram of Fig. 13 in connection with Fig. 1. The diagram shows the relation of the Own Ship and target under the conditions represented by the readings of the dials of Fig. 1. As explained above the target dial 6 will be displaced by rotation of the shaft 34, an amount corresponding to the displacement of the target course pointer 4, which as shown in Fig. 1 is 260°, this being the target's true course as shown in Fig. 13. As further explained, the target dial 6 will also be displaced in accordance with the setting of the target bearing pointer 3, which in Fig. 1 is shown as 120°, the true target bearing as shown in Fig. 13.

If with the target dial 6 occupying the position shown in Fig. 9 it be rotated clock-wise through 260°, as it will be when the target course pointer 4 is turned through the same angle, the 280° division of the dial will be opposite the pointer 7. The setting of the target bearing pointer 3 causes the counter-clockwise rotation of the target dial 6 through 120° which will then bring the 40° division of the dial opposite the index mark 7 as shown in Fig. 1 to indicate that the target angle, that is the angle between the target's course and the line of sight, is 40°, as appears in Fig. 13.

There is no attempt to preserve the geographical relationship of Own Ship and the target in the arrangement of the Own Ship's dials 1 and 2 and the target dial 6, but the readings of these dials definitely show what these relations are. In order that the geographical relationship of Own Ship and the target may be readily visualized by the operator, a small Own Ship's dial 10 is provided. The outline of Own Ship on the dial 10 and that of the target on the dial 6 assume positions which correspond to the actual positions of Own Ship and the target on the surface of the water. Due, therefore, to the manner in which the actual relations of Own Ship and target are reproduced in the instrument, the normal position of the target dial 6 is with the 180° division opposite the pointer 7.

Subsequent movements of the dial in accordance with the true course of the target and the true bearing of the target from Own Ship will cause the dial to indicate opposite the pointer 7 the true target angle.

To sum up the relative movement of the parts described, it is evident from the preceding description that—

I. The rotation of the compass drive dial 2 causes the corresponding rotation of the target course pointer 4, the target bearing pointer 3 and "Own Ship" dial 10, the target dial 6 not being rotated.

II. The rotation of the target course pointer 4 causes a corresponding rotation of the target dial 6, but does not affect the compass dial 2, the target bearing pointer 3 and "Own Ship" dial 10.

III. The rotation of the target bearing pointer 3 causes a corresponding rotation of the target dial 6 and "Own Ship" dial 10 but the target course pointer 4 and the compass dial 2 remain stationary.

The target dial 6 carries a speed scale which cooperates with the movable pointer 9. This pointer is carried by a sliding block 80 (see Fig. 3.) which is mounted in slideways in a frame 81 carried by shaft 25, previously described. The block 80 comprises a traveling nut mounted upon a screw shaft 82, which is journalled in the frame 81. At one end the screw shaft 82 carries a gear 83 which meshes with a crown gear 84 (see Fig. 3) loosely mounted upon the shaft 25, whereupon relative rotation of the gear 84 and the shaft 25 will cause a rotation of the shaft 82 to displace the sliding block 80 and the pointer 9. A sliding block 85, of a similar construction, is adjustably retained in a guide frame that is secured to the lower end of the shaft 25. This block is mounted upon a screw shaft 87 mounted in the guide frame 86. The screw shaft 87 is driven by a gear 88 which meshes with crown gear 89 which is also loosely mounted upon the lower end of the shaft 25. Parallel with shaft 25 is a counter shaft 90, which carries at its ends two gears 91 and 92 which mesh with the spur gears carried by the hubs of the crown gears 89 and 84, respectively. The shaft 90 also carries a differential consisting of gears 93, 94, 95 and 96. The gears 94 and 95 form the centre of the differential and are carried by a spider fastened to the shaft 90. The gear 93 is carried by a sleeve to which is secured the gear 27 which through the gear 26 drives the shaft 25 and, hence, the target dial 6. The gear 96 is carried by a sleeve which also carries the bevel gear 97 which meshes with the bevel gear 98 upon the shaft of crank 99.

To set up an estimated speed for the target the crank 99 is turned, which will cause a relative rotation of the shaft 25 and the gears 84 and 89 through the driving connection described to displace the sliding blocks 80 and 85 similar amounts until the estimated speed is read opposite the pointer 9 on the speed scale. Ordinarily, when the shaft 25 is rotated through the gear 26, the gear 93 will be correspondingly driven which will drive the centre of the differential and the shaft 90 at half the speed. The gears 91 and 92 will then drive the gears 84 and 89, in the same direction as the shaft 25 at the same speed so that there is no relative rotation between these parts, which will preclude a displacement of the blocks 80 and 85. Due to the construction described, the target speed can be changed either while the shaft 25 is being rotated or at rest and without disconnecting the crank 99.

As will also be clear from Fig. 3, the shaft 21 upon which is mounted the target bearing pointer 3 also carries at its lower end a guide frame 100 in which a traveling block 101 rides. This block is threaded upon a screw shaft 102 which is driven by a gear 103, the construction being similar to the displaceable block 85 and associated parts. The gear 103 is driven by a crown gear 104 which is loosely mounted upon the shaft 21 and is actuated by a gear 105 mounted upon a counter-shaft 106. The shaft 106 carries a differential 107, one side of which is driven by a crank 108 which also actuates the dial 5 for setting up the "Own Ship's" speed. The gear 23 which actuates the shaft 21 is loosely mounted upon the counter shaft 106 and is connected to the other side of the differential. The construction and operation is similar to the speed setting device for the target, the rotation of the crank 108 causing a displacement of the block 101 when it is desired to change the speed of "Own Ship," the dial 5 giving a reading of the speed set up.

As will be clear from Fig. 1, the screw shaft 82 which carries the block 80, is arranged so that it makes with the line 3—3 an angle which corresponds to the angle between the target and the line of fire or bearing between the two ships and the block is also displaced a distance from the centre of the dial corresponding to the speed of the target. A line joining the centre of the dial and the centre of the block therefore constitutes a mechanical vector which represents the target's course and speed and is designated by the line indicated B—D. It is also clear that since the frame 86 is arranged parallel to the frame 81 and the block 85 is displaced equally to the block 80, a second mechanical vector is also obtained having a direction corresponding to the course of the target and a length corresponding to the speed of the target. The two components of this vector B—C and C—D, which are obtained by resolving the vector along the line of fire or bearing and at right angles thereto, will then represent the rate of change of range and the deflection, respectively.

In the same way the sliding block 101 and its frame 100 is arranged directly beneath the target bearing pointer 3, so that these two parts are always in alignment. A mechanical vector is therefore obtained which has been designated E—F. If this vector, which lies along the target bearing, is resolved into two components, one parallel to the fore and aft line of the ship, which is the course of the ship, and is shown by the line E—G the component E—G will then be proportionate to the range rate due to the movement of "Own Ship" and the component F—G at right angles thereto will be proportionate to the deflection of "Own Ship." This is true because if a vector representing the speed and course of "Own Ship" is resolved into its components along the target bearing line and at right angles thereto and if a second vector is laid out upon the target bearing line for a length proportional to the speed of "Own Ship" and is resolved into its components along the course of "Own Ship" and at right angles thereto, it will be found that two equal right triangles are thus obtained, the length of whose sides will correspond to the components of range rate and deflection due to "Own Ship."

To mechanically resolve the mechanical vectors into their components, slides are utilized, and from Figs. 2 and 3, it is clear that the block 85 and the block 101 carry pins 110 and 111 respectively. The pin 110 controls the movement of two slides 112 and 113 which are constrained to move at right angles to each other by rollers or other suitable anti-friction devices. The pin 111 also controls the movement of two slides 114 and 115, arranged at right angles to each other. The slides 112 and 114 have a movement which is proportional to the range rate of the target and "Own Ship", respectively, which components are algebraically added together by the differential 115′ which is actuated by gears meshing with racks carried by the slides, one side of the differential 115′ and a gear 116 movable with that side having a movement which is proportional to the algebraic sum of the displacement of the slides 112 and 114. The differential 115′ through gears 116 and 117 and 116′ and 117′ drive a shaft 118 whose angular displacement is therefore proportional to the total range rate due to "Own Ship" and the target. In the same way the algebraic sum of the slides 113 and 115 is obtained by the differential 118a, which causes an angular displacement of the shaft 119 proportional to the total deflection due to the movements of "Own Ship" and of the target. The shafts 118 and 119, since their angular displacements are proportional to the range rate and deflections, respectively, may be utilized to drive indicators such as are shown in Figure 2 for giving dial readings of these factors if desired. Meshing with gear 117′ on shaft 118 is a gear 117a on a shaft having at its other end a gear 117b which meshes with a gear 117c attached to a suitable range rate indicator 117d. The shaft 119 carries a gear 119a which meshes with a gear 119b attached to a suitable deflection indicator 119c.

Shaft 118 is also connected to a variable speed mechanism disclosed in Fig. 4 for generating the range, the shaft 118 being connected to a rack 120 through a gear 119′ to translate the movement of the shaft 118 to a cage 121 which carries two balls 122, only one of which is shown in Fig. 4. The variable speed device in addition to these two balls comprises a disc 122′, which is driven by a gear 124 from a shaft 125 which is actuated at a constant speed by a motor 126. This constant speed motor may be either an electrical or spring motor. The disc 122′ constitutes the driving element of the variable speed transmission and a roller 127 which is mounted in a yoke 128 constitutes the driven member thereof, the two balls 122 being interposed between these parts, forming a flexible connection between them which permits of infinite variations in the speed of the roller without any slipping. This variable speed mechanism, since the disc 122′ is driven at constant speed, provides an integrating device which will integrate the range rate and the roller 127 may be utilized to drive a range counter for giving direct readings of range, which counter will continue to indicate the proper range if it has been initially set for the initial range between the two ships. Such range counter is indicated at 132 (see Fig. 5) the counter being driven from the roller 127 by a shaft 133a. This range counter and the connecting parts will be hereinafter referred to.

The total deflection of the two ships, which is proportional to the angular displacement of the shaft 119, is also integrated to generate the bearing. As is well known, the deflection is equal to R d B where R represents the range and d B the rate of change of bearing. In order to generate the bearing it is, therefore, necessary, to divide the factor R d B by R and then integrate the rate of change of bearing thus obtained. In the present construction this is performed by the two sectors shown. The sector 141 is angularly displaced according to the deflection. A second sector 142 is connected to the sector 141 by links 143 and 144. The link 143 has an enlarged intermediate portion which is slotted for the reception of a pin 145. The pin 145 is carried upon a travelling nut or block 146 mounted on a screw shaft 149 located in a radial slot in the sector 142, which screw shaft is driven by the roller 127 through the shaft 150 or by a crank 151. The displacement of the block 146 is therefore proportional to the range and when the range is at minimum the block occupies its lowermost position in the slot and when at maximum its uppermost position. The displacement of the sector 142 will therefore be proportional to $$\frac{R\,dB}{R} = dB,$$

which is the rate of change of bearing. The sector 142 therefore is utilized to control an integrator 142a which generates the bearing, the roller of the integrator being connected to a shaft 74a, which through bevel gears is connected to the shaft 74 (see Fig. 1), constituting the automatic drive for the target bearing pointer 3 as previously described.

The operation of the instrument thus far described will be evident from the preceding description. The course of "Own Ship" is automatically carried into the instrument by the repeater motor 16a from the compass 16e through the shaft 15, so that the compass dial 2 is always maintained set in accordance with the course which the ship is steering. The speed of "Own Ship," which can be determined from the ship's speedometer or log, is set up in the instrument upon the dial 5 which will simultaneously displace the block 101. The mechanical vector whose direction corresponds to the direction of "Own Ship" and whose length corresponds to the speed of "Own Ship" may therefore be set accurately, as long as the target bearing pointer 3, with which the vector is in parallelism is set accurately. However, the course and speed of the target are not known and can only be estimated. The target dial 6 and target course pointer 4 are however set to the initial estimated course of the target. The same is true of the target speed which is set by moving the block 85 carrying the speed pointer 9. In this manner an approximate estimate of the course and speed of the target is first taken which is utilized to set the mechanical vector comprising the block 85 and the guide pin 110 which actuates the slides for resolving the target vector into its range rate and deflection components.

The apparatus thus far described is similar to the apparatus shown in my Patent No. 1,450,585 and the additional features of the present invention relate particularly to the means and method for indicating the correct course and speed of the target and for correcting the estimated course and speed from available information regarding the actual range and bearing.

Referring again to Fig. 1, it will be seen that extending across the face of the target dial 6 are a pair of cross wires 200 and 201 arranged at right angles to each other. The vertical wire 200 is carried by a pair of slides 202 and 203, which are supported by rollers 204 so that the slides may move back and forth easily. In the same manner the horizontal cross wire 201 is carried by a pair of slides 206 and 207, which are also guided by rollers 208. These two wires when taken together serve as a means for indicating the correct course or speed or both of the target, the vertical wire being primarily for the purpose of estimating errors in the generated bearing resulting from a wrong course or speed of the target and the horizontal wire 201 for indicating an error in the generated range due to a wrong course or speed of the target.

Referring first to the connection to the vertical wire 200, it is to be noted, in Fig. 6 of the drawings, that a target bearing telescope 210, of a usual construction, is shown which is adapted to be angularly rotated by means of a handle 211. An electric transmitter 212 is connected to the telescope for the purpose of transmitting the angular movement of the telescope to a repeater motor 212a, shown in Fig. 1 of the drawings, which repeater motor through bevel gears 213 and 214 angularly displaces the shaft 215 an amount equal to the actual target bearing as determined by the target bearing telescope. The shaft 215 through the gears 216, 217 and 218 drives a pointer 219 arranged concentrically with the target bearing pointer 3. The pointer 219 is mounted upon a sleeve 220 which carries a gear 218 (see Fig. 3), which meshes with the gear 217 as described, the gear ratios being such that the pointer 219 is moved to indicate the true actual bearing upon the compass dial 2 and the relative target bearing upon the relative bearing dial 1 in the same manner as does the target bearing pointer 3 indicate the true target generated bearing upon the compass dial 2 and the relative target generated bearing upon the relative bearing dial 1. It is obvious that if the automatic and actual target bearing pointers coincide, then the actual and generated bearing is the same. The two pointers are shown in this position in Fig. 1 of the drawings. However, any difference in the position of the target bearing pointer 3 and the actual target bearing pointer 219 will indicate that the course or speed or both, estimated for the target, are incorrect and should be corrected.

In order to indicate this error the vertical wire 200 is utilized and the connection to the wire will now be described. As previously stated, the shaft 58 is driven proportionally to the generated target bearing which drives the pointer 3. The angular displacement of the shaft 215 is proportional to the actual target bearing as determined by the target bearing telescope. The displacement of the shafts 58 and 215 are superimposed upon each other and the difference of their displacements is magnified and utilized to drive the vertical cross wire 200. This superimposing is accomplished by differential gearing which comprises a gear 225 fastened to the shaft 215 which meshes with fear 226 mounted upon a sleeve carrying the gear 227, forming one of the gears of a differential. The shaft 58 also carries a gear 228 which meshes with gear 229 mounted upon a sleeve carrying a gear 230 which forms a second gear of the differential. The other two gears of the differential consist of gears 231 and 232, which gears constitute the centre of the differential and are fastened to a shaft 233. It will therefore be seen that when the shafts 58 and 215 are angularly displaced equal amounts the gears 227 and 230 of the differential will be displaced in opposite directions equal amounts and, hence, the centre of the differential will stand still imparting no movement to the shaft 233. When, however, the shaft 58 is displaced a greater or less amount than the shaft 215, the centre of the differential will be rotated in one or the other direction to cause a corresponding rotation of the shaft 233. The rotation of the shaft 233 through a flexible connection consisting of a heart-shaped cam 234 and roller 235, which will be hereinafter referred to, drives a second shaft 236 upon which is mounted a gear 237 which meshes with a gear 238 mounted upon a sleeve carrying gear 239 which forms one gear of a second differential. The other gears of this differential are designated 240, 241, and 242. The gears 240 and 241 constitute the centre of the differential and are carried by a spider fastened to a shaft 243. This shaft forms a continuation of shaft 243, shown in Fig. 2 of the drawings, the shaft 243 being connected by bevel gears 244 and 245 to a cross shaft 246 which is connected by bevel gears 247 and 248 to a shaft 249. The shaft 249 carries a gear 250 which meshes with a rack 251 carried by the deflection slide 113 of the target vector, the shaft 249 actuating the centre of the differential 118a to add the components of the deflection of "Own Ship" and target as described. The displacement of the shaft 243 is therefore proportional to the displacement of the deflection slide 113 of the target. Referring again to Fig. 1, the shaft 243 carries the centre of the differential, consisting of gears 240 and 241, and the gear 239 is rotated or displaced proportionally to the difference between the actual and automatic bearing. The gear 242 of the differential will therefore be displaced an amount proportional to the difference between the actual and automatic bearing corrected for an amount which is proportional to the movement of the deflection slide 113 of the target. The gear 242 is therefore utilized to drive the vertical cross wire 200, this gear being mounted upon a sleeve which carries gears 252 and 253 which mesh with the racks 254 and 255 carried by the slides 202 and 203. To further explain the movement of the vertical wire 200, when the actual and automatic bearings are the same, the vertical cross wire will stand directly over the block 80 as shown in Fig. 1 of the drawings and will remain so if the target dial is turned since the connection to the shaft 249 will move the wire to keep it over the block if the actual and automatic bearings are the same. Any difference in bearing will however, cause the vertical wire to move to the right or left and thus give an indication that the course or speed or both estimated for the target are incorrect. The arrangement of gears described for the vertical cross wire is such that the vertical cross wire will move in a direction in which the course or speed of the target should be changed, for example, if in Figure 1, the vertical cross wire moves to the left, it would indicate that either the speed of the target should be decreased or that its course should be changed by swinging the target dial in a clockwise direction. It will, of course, be understood that the position of the horizontal wire must be taken into consideration in conjunction with the vertical wire to determine whether the course or speed or both should be changed, as will be later explained in the operation of the device.

In order to indicate clearly the difference in the actual and automatic bearing, the gear ratio to the vertical cross wire 200 is such that any difference in the actual and automatic bearing is magnified considerably, as for example, in the embodiment of the invention the difference of 12° in the automatic and actual bearing will cause a displacement of the vertical wire entirely across the face of the target dial. Therefore, in order to prevent injury to connections and the vertical wire when it is so displaced the flexible connection consisting of the cam 234 and the roller 235 is utilized. The construction of this connection is as follows:—The heart-shaped cam 234 is fastened to the shaft 233; the roller is carried upon an arm 260 which is pivoted to an arm 261, fastened to the shaft 236. These two arms 260 and 261 are connected by a spring 262 which normally holds the roller in the depression in the heart-shaped cam. When, however, the cross-wire reaches the limit of its movement in either direction, the shaft 236 will be prevented from further rotation and the roller 235 will then ride out of the depression in the cam along the face of the cam until the peak of it has been reached stretching the spring 262. When the roller passes the peak of the cam the tension of the spring 262 is sufficient to cause the roller 235 to ride along the opposite face of the cam and therefore cause the shaft 236 to be rotated in a direction to snap the wire back across the face of the target dial 6. This action will be repeated should the actual bearing pointer 219 and the automatic bearing pointer 3 again move out of synchronism to an amount equal to 12°. However, after the vertical wire has snapped over, its function as an indicator is no longer present and the heart-shaped cam and roller therefore serve merely as a means for preventing injury to the parts, which might occur if a positive connection were used.

If it is desired to manually operate the actual bearing pointer 219, a crank 215a attached to the lower end of the shaft 215 may be utilized. By pushing in upon the crank 215a, the shaft 215 is moved inwardly as shown in Fig. 1, which will disconnect the gear 214 from the gear 213 of the repeater motor 212a. The gear 216 which is mounted to slide on a squared portion of the shaft 215 will remain in mesh with the gear 217 being held in place by the keeper 218a, and therefore, the manual rotation of the shaft 215 will cause the gear 216 to actuate the gear 217 and the actual target bearing pointer 219 in the same manner as if it were driven by the repeater motor.

If it is desired to lock the automatic target bearing pointer 3 and the actual target bearing pointer 219 together, a button 220a is pushed in. This button is connected to a bracket 221a which has a portion surrounding a hub upon the shaft 215 so that the pushing in of the button will also cause an inward movement of the shaft 215 to disconnect the gear 214 from the gear 213 of the repeater motor. The bracket 221a carries an extension 222a which is provided with a detent 223a which when the extension 222a is pressed inwardly engages a gear 225a upon the shaft 233 to lock the shaft 233 against movement. If the crank 70 which manually actuates the target bearing pointer 3 is then actuated, the movement of the automatic target bearing pointer 3 will be communicated to the pointer 219 through gears 228 and 229 to the differential consisting of gears 230, 231, 232 and 227 to actuate the gears 226 and 225 and hence the shaft 215. The automatic target bearing pointer 3 and the actual target bearing pointer 219 will therefore rotate at the same speed. It is obvious, however, that in the normal operation of the instrument, the button 220a is in its outer position and is pressed inwardly only in effecting an initial setting of the target bearing pointers 3 and 219 to the approximate target bearing between Own Ship and the target, after which, the button 220a is again pulled out and these parts function as already described.

Summing up the actuation of the vertical wire, it will be seen from the previous description that the wire is moved across the face of the target dial from a point over the spot on the displaceable block 80 of the vector either to the left or right to indicate an error in the automatic bearing which results from an incorrect estimation of the course or speed or both of the target.

The horizontal wire is utilized to give an indication of the error in the range rate due to an incorrect estimation in the course or speed of the target. Briefly stated, this indication is given in the embodiment of the invention shown by determining the total range rate due to the actual range received from available information such as range finders, and spots and then by subtracting from this total range rate obtained in this manner the range rate due to "Own Ship", thereby obtaining the actual range rate due to the target, and the horizontal wire is then displaced proportionately to this range rate. Under normal conditions if the course and speed of the target is correctly assumed, then the horizontal wire will remain over the spot or block 80. However, any error in the assumed course and speed of the target, which must necessarily affect the range rate, will through the connections as hereinafter described cause a displacement of the horizontal wire up or down, which will indicate that the range rate should be increased or decreased, depending upon the position of the target dial 6 and the vector representing the course and speed of the target.

Referring to the construction, the horizontal wire is carried by the two slides 206 and 207, upon which are mounted racks 270 and 271 meshing with pinions 272 and 273 carried by a shaft 274 to which they are fastened. The pinion 273 is carried by a sleeve which also carries a gear 275 forming a part of a differential additionally comprising gears 276, 277 and 278, the gears 276 and 277 constituting the centre of the differential and being fastened to a shaft 279. The gear 278 is loose upon the shaft 279 and is carried by a sleeve which also carries gear 280, meshing with the gear 281 upon the shaft 282. The shaft 282 is displaced proportionately to the total range rate by a construction hereinafter to be described, while the shaft 279 is displaced proportionately to the range rate of "Own Ship" set up by the vector representing "Own Ship", as will now be described. The shaft 279 is connected by bevel gears 285 and 286 to a shaft 287 which is continued from Fig. 1 to Fig. 2, where it is connected by bevel gears 288 and 289 to a shaft 290 which carries a gear 291 meshing with a rack 292 mounted upon the range rate slide 114 of "Own Ship", which slide as previously described through the differential 115′ actuates the gear 116 to cause a displacement of the shaft 118 an amount which is equal to the algebraic sum of the range rate due to "Own Ship's" range rate slide 114 and the target's range rate slide 112. The displacement of shaft 287 is however equal to the range rate of "Own Ship" since it is connected directly to shaft 290 which is actuated by slide 114.

Referring now to Fig. 5, the construction whereby the shaft 282 is driven proportionately to the total range rate, due to the actual range rate between the two ships, will now be described. As before referred to, the movement of shaft 133a which drives the present range counter 132 is proportional to the generated range. This shaft 133a is through gears 290′ and 291′ connected to a shaft 292′, whose displacement is also proportional to the generated range. The shaft 292′ carries a differential consisting of gears 293, 294, 295, and 296, the gears 294 and 295 constituting the centre of the differential having their spider secured to the shaft 292′. The gear 293 is secured to a sleeve loosely mounted upon the shaft 292′, which sleeve also carries the bevel gear 299 which meshes with a bevel gear 300 carried by a shaft 301 which is connected up to a second range counter 302 which we will designate "the advance range counter." Since the centre of the differential is connected to the shaft 292′, the gear 293 will be driven at twice the speed of the shaft 292′ and as the gears 299 and 300 are in a ratio of 1 to 2, the advance range counter 302 will therefore be driven at the same speed as the present range counter 132. The bevel gear 299 is also normally in mesh with a bevel gear 304 carried by shaft 305 which shaft also carries a beveled gear 306 which meshes with a gear 307 carried loosely upon the shaft 308, so that normally the gear 307 is driven at ½ the speed of the generated range rate. The gear 307 is mounted upon a sleeve which carries a bevel gear 310 which joins a differential with gears 311, 312 and 313, the gears 311, and 312 constituting the centre of the differential and being fastened to the shaft 308. The gear 313 of the differential carries a sleeve upon which is mounted a spur gear 315 which meshes with a similar gear 316 secured to the end of a roller 317. This roller forms a part of a variable speed mechanism similar to the one used for generating range and bearing, and consists of a disc 318 which is driven by gears 319, 319a, 320 and 320a and shaft 321, which shaft is a continuation of the shaft 321 shown in Fig. 4 of the drawings and connected to the shaft 125 of the constant speed motor 126 by bevel gears 322 and 323. The disc 318 is therefore driven at constant speed. Interposed between the roller and the disc are a pair of balls 324 and 325 which are carried by a cage 326, which cage also has secured to it a rack 327. A gear 328 mounted upon a shaft 329 which is a continuation of shaft 282 meshes with this rack and this shaft is normally driven by gears 330 and 331 mounted upon the shafts 308 and 329 respectively. As is well known in variable speed mechanisms of this character, the speed and direction of the roller 317 is dependent upon the distance of the balls from the centre of the disc, the roller rotating in one direction at increased speeds as the balls move from the centre of the disc and in the other direction at increased speeds when the balls move from the centre of the disc towards the opposite end of the roller. The shaft 282 shown in Fig. 5 is a continuation of the shaft 282 shown in Fig. 1, which has already been referred to as the shaft whose displacement is proportional to the total range rate due to the changes in the actual range between the two ships.

The manner in which the actual range is determined will now be described. Mounted to the right of the present range counter 132 is a third range counter designated 335, which we will refer to as the "range finder counter" inasmuch as it is set in accordance with the readings obtained from the range finders upon a battle-ship or other craft. This counter is also normally driven from the shaft 292' in accordance with the generated range through the shafts 336 and 337, the shaft 336 being normally connected to the shaft 292' by means of bevel gears 338 and 339 and the shaft 336 being connected to the shaft 337 by bevel gears 340 and 341. When, a range finder reading is sent to the operator of the instrument which differs from the reading on the range counter 335, a crank 340a is pressed inwardly, which will press the gear 341a into mesh with gear 342 carried by and fixed to the shaft 336, the gear 342 being pressed towards the gear 341a (as shown in dotted lines) by a stop 345 upon a rod 346 which stop actuates one end of a bell-crank 347, the other end of which is provided with a yoke engaging the sleeve of the gear 342. The spring 348 returns the gear 342 to its normal position after the crank 340a is released. The rod 346 also engages a second bell-crank 350 to press the same to its dotted-line position against the tension of the spring 351. This bell crank is also provided with a yoke engaging a collar 352 upon the shaft 305, which collar forces the shaft 305 to the right throwing the gear 304 out of mesh with the gear 299 and causing a gear 353 to mesh with a gear 354 upon the shaft 337. The gear 306 is slidingly mounted upon the shaft 305 but is prevented from rotation thereon so that upon a longitudinal displacement of the shaft 305 to the right this gear will still remain in mesh with the gear 307, being held in mesh with this gear by a spring 355. It will also be clear that the gear 339 is thrown out of mesh with the gear 338 upon the operation of the bell-crank 347, which will also interrupt the connection between the shaft 292' and the counter 335. It will, therefore, be seen that the pressing in of the range finder crank 340a disconnects the counter 335 from the "generated range" shaft 292' and connects it to the crank for manual operation.

Assuming now that the range finder readings are being obtained from the range finder operators or from other sources at constantly recurring intervals of, say, one-half minute apart, the crank 340a would then be turned slowly to maintain the reading of the range counter equal to the range finder readings. The balls between the roller and the constant speed disc will then be displaced until the speed of the gear 315 is equal to the speed of the gear 307. To explain this action more fully, let us assume that the gear 307 is being rotated by the crank 340a at a greater speed than that of the gear 315. The centre of the differential, or gears 311 and 312, will then turn the shaft 308 which through its connection to the rack 327 of the ball cage will cause the balls to move outwardly until the speed of the gear 315 is equal to the speed of the gear 307, when further rotation of the centre of the differential will cease. The distance which these balls are then from the center of the disc will give a true measure of the total range rate due to the actual range between the two ships. If the crank 340a is rotated slowly and constantly to keep the range counter 335 reading the same as the readings obtained from the range finder, the gear 307 is driven at a speed which is proportional to the total rate of change of range, which rate of change is measured by the variable speed mechanism in the manner described. This measure of the total range rate is carried by the shaft 282 to the gear 281, shown in Fig. 1 of the drawings, and thence to the differential consisting of gears 275, 276, 277 and 278. By means of this differential the range rate due to "Own Ship" is subtracted from the total range rate obtained from the actual readings of range from the range finder since the differential is connected to shaft 287 and the horizontal wire 201 is therefore displaced from the centre of the target dial 6 an amount which is proportional to the actual range rate of the target. If, therefore, the displaceable block 80, which carries the spot D and the movable pointer 9, has its position varied either by changing the speed of the target or by varying the course of the target until the spot is under the horizontal wire and remains under the horizontal wire, assuming that the crank 340a is at all times being slowly rotated to generate the actual rate of change of range, an absolute indication of the required range rate for the target is obtained.

In practice, however, it is impractical to rotate the crank 340a so that the shaft 337 is driven manually at a speed proportional to the actual rate of change for when a range finder reading is obtained this crank is rotated quickly to cause the counter 335 to correspond with the range finder reading obtained. Under these conditions the gear 307 will be driven faster than the actual rate of change of range and will cause a movement of the horizontal wire beyond the line at which its displacement would be directly proportional to the actual range rate of the target. However, the moving of the horizontal wire in this manner will give an indication to the operator of the instrument that assumed range reading is incorrect and inform him that the course or speed or both course and speed of the target should be changed in order to increase or decrease the range rate, depending upon the direction in which the horizontal wire moves away from the spot. After the crank 340a has been actuated as described and is again released, the horizontal wire will then move slowly back over the spot since upon the release of the crank, the gear 307 will again be driven proportionately to the generated range which will cause a movement of the centre of the differential and, hence, the shaft 308 to adjust the position of the balls 324 and 325 until the speeds of the gears 307 and 315 are again equal, under which conditions the horizontal wire must be necessarily over the spot.

As is frequently the practice in naval warfare, when the ships start to open fire instead of using range finder readings to correct the range between the two ships "spots" are utilized, by which is meant an estimate of the distance which a shot fired from a gun for a known range falls long or short of a target. To permit the actual range to be obtained by use of "spots" the crank 360 is provided, which crank through gears 361 and 362 is connected to the differentials consisting of gears 293, 294, 295 and 296. Any movement of the crank 360 through this differential is imparted to the shaft 305 which is normally driven at a speed corresponding to the generated range rate to cause a displacement of the gear 307 which will have the same effect upon the horizontal wire as the displacement of the gear 307 manually, in accordance with the range finder readings.

To place a ballistic correction onto the advance range counter 302, the knob 365 is pressed inwardly and the handle 360 for the spots is turned, which will cause an actuation of the advance range counter 302 without affecting any other part of the device. This is true because the pressing in of the knob 365 disconnects gear 304 from gear 299, so that the rotation of this gear will affect the advance range counter 302 alone, superimposing the movement of the crank 360 upon the generated range shaft 292.

It is frequently desirable to indicate at the target bearing telescope when the bearing of the telescope corresponds to the generated bearing to enable the operator to train in accordance with the generated bearing in case the target is obscured. For this purpose the indicator 370 shown in Figure 6 of the drawings is utilized. This instrument comprises the usual type of voltmeter which is provided with a scale 371 and a pointer 372, the pointer being normally at the center of the scale and moving to the right or left in accordance with the direction of the current passing there-through. This voltmeter is connected to a resistance 373 as shown in Figures 1 and 7a and co-operating with the resistance is a rotary contact 374 which is mounted upon the shaft 233 and is engaged by a stationary contact 375.

The shaft 233, as previously described is connected to the center of the differential comprising gears 231 and 232 while gear 227 of the differential is driven from the shaft 215 actuated by the target bearing telescope and the gear 229 by the shaft 58 which moves proportional to the generated bearing. As also before described, when the shafts 215 and 58 are rotating at the same speed, the generated and actual bearing is the same in which instance the center of the differential and the shaft 233 remains stationary.

Referring to Figure 8, a diagram of the electrical connections is shown. One side of the voltmeter or indicator 370 is connected by wires 380 and 381 to the middle point of resistance 373 dividing it into two equal sections 373a and 373b. The section 373b is connected by a wire 382 to a plus side of a source of electrical energy and the section 373a to the minus side by means of a wire 383. The other side of the voltmeter is connected by a wire 384 and stationary contact 375 to the rotary contact 374.

Assuming that the parts are in the position shown in Figure 8, no current will pass through the voltmeter 370 and the needle 372 will be in its center or zero position.

Assuming further, that the contact 374 is moved in one direction due to a difference in the actual and generated bearing, as for example to the dotted line position 374a. Current will then pass through the wire 382 and portion of the resistance 373b to the contact 374a, wire 384 through the voltmeter and wires 380 and 381 to the center point of the resistance, then through resistance 373a and wire 383 to the negative side of the line. The current will also pass directly through sections 373b and 373a to the negative side of the line and the current passing through the voltmeter will give a measure of the difference in potential of the line between the center point 381a and the point of contact of the contact 374a with the resistance 373b. When the arm occupies the dotted line position 374b, current will then pass through the voltmeter in the opposite direction through wires 380 and 381, voltmeter 370, wire 384, contact 374b and a portion of the resistance 373a to the negative side of the line. The reversal of the current will cause the needle to move in the opposite direction and measure the difference in potential between the points 381a and the point of contact of the spring contact 374b with resistance 373a.

It will therefore be seen that any difference in the actual and generated bearing will be indicated at the target bearing telescope.

It is to be understood of course, that other indicating systems may be utilized if desired instead of the electrical one disclosed for giving this indication at the target bearing telescope and it is intended that such systems shall come within the scope of the invention as pointed out in the appended claims.

I claim:

1. In an instrument of the class described, a mechanical vector representing the course and speed of a moving object, a second mechanical vector representing the course and speed of a second moving object, a part adapted to be moved proportional to the actual range between the objects, a part adapted to be moved proportional to the actual angular relation between the objects, means for generating and indicating the range and angular relation of the objects from the mechanical vectors and means for superimposing upon the indications of range and angular relation of the objects indications of the movement of said parts whereby the actual and generated ranges and the actual and generated angular relations may be compared.

2. In an instrument of the class described, a mechanical vector representing the course and speed of a moving object, a second mechanical vector representing the course and speed of a second moving object; a part adapted to be moved proportional to the actual range between said two objects, a part adapted to be moved proportional to the actual angular relation between said two objects, means for generating the range and angular relation between said objects from said mechanical vectors, means for comparing the actual and generated ranges and the actual and generated angular relations and means for indicating an error in one of the mechanical vectors when the actual and generated ranges and angular relations differ.

3. In an instrument of the class described, a mechanical vector representing the course and speed of a moving object, a second mechanical vector representing the course and speed of a second moving object, a part adapted to be moved proportional to the actual range between said two objects, a part adapted to be moved proportional to the actual angular relation between said two objects, means for generating range and angular relation of said objects from said mechanical vectors and means for comparing the actual and generated ranges and actual and generated angular relations, a part actuated in accordance with the generated and actual angular relations for indicating an error in the deflection component of one of the said vectors and a part actuated in accordance with the actual and generated ranges for indicating an error in the range rate component of said last named vector.

4. In an instrument of the class described, a mechanical vector representing the course and speed of a moving object, means connected to said vector for generating the angular relation and range between said object and a second object, a pair of cross wires arranged over said vector, means actuated in proportion to the actual range and angular relation between said object and station for moving said cross wires to bring them over the extreme end of said vector when the generated range and angular relation equals the actual range and bearing, and for moving them away from the end of said vector when the actual range and angular relation differ from the generated range and bearing in a direction to indicate the required correction in the length or direction or both of the vector.

5. In an instrument of the class described, means for setting up the estimated course and speed of a moving object, means connected thereto for generating the angular relation and range between the object and a second object, and means actuated in proportion to the actual range and angular relation between said objects for indicating an error in the estimated course and speed of the first object.

6. In an instrument of the class described, means for setting up the estimated course and speed of a moving object, means connected thereto for generating the angular relation and range between the object and a second object, means actuated in proportion to the actual range and angular relation between the objects for indicating a required correction to the estimated course and speed of the object to bring the generated angular relation and range equal to the actual angular relation and range.

7. In an instrument of the class described, means for setting up an estimated course and speed of a moving object, means for generating the range and angular relation between said object and a second object in accordance with said estimated course and speed and means for comparing the actual range and angular relation with the generated range and angular relation for giving an indication of an error in the estimated course and speed when the actual range and angular relation differ from the generated range and bearing.

8. In an instrument of the class described, means for setting up an estimated course and speed of a moving object, means for generating the angular relation and range between said object and a second object in accordance with said estimated course and speed, and means actuated in proportion to the actual range and angular relation between said objects for giving an indication of an incorrect estimate of the course and speed of the moving object.

9. In an instrument of the class described, a mechanical vector representing the course and speed of a moving object, means for generating the angular relation and range between said object and a second object in accordance with said vector and means actuated in proportion to the actual range and angular relation between said objects for indicating an error in the direction or length or both of said mechanical vector.

10. In an instrument of the class described, a mechanical vector representing the course and speed of a moving object. means for generating the range and angular relation between said object and a second object in accordance with said mechanical vector and means actuated in proportion to the actual range and angular relation between said objects for indicating an error in the range rate component or the deflection component of said vector.

11. In an instrument of the class described, a mechanical vector representing the course and speed of a moving object, variable speed mechanism connected to said mechanical vector for generating the range and angular relation between said moving object and a second object, a pair of cross wires normally arranged with their point of intersection over the extreme end of said mechanical vector, means actuated in proportion to the actual range between the objects connected to one of said wires for moving it when the actual range differs from the generated range, and means actuated in proportion to the actual bearing between the objects connected to the other of said cross wires for moving it when the generated angular relation differs from the actual angular relation.

12. In an instrument of the class described, a mechanical vector representing the course and speed of a moving object, variable speed mechanism for generating the range and angular relation between said object and a second object in accordance with said vector and means actuated in accordance with the actual range and angular relation between the objects having parts associated with said mechanical vector for indicating an error in the range rate or deflection component of said vector when the generated range and angular relation differ from the actual range and angular relation.

13. The combination with an instrument for continuously generating the angular relation between two objects, and an instrument disposed at a remote point for continuously determining the actual angular relation between the objects, of means for determining any difference between the actual and generated angular relations and means for indicating such difference at the target angular relation instrument.

14. The combination with an instrument for continuously generating the angular relation between two objects and a target angular relation instrument for continuously determining the actual angular relation between the objects, of a part having a movement proportional to any difference between the actual and generated angular relations and means reproducing the movement of said part at a remote point.

15. The combination with an instrument for continuously generating and indicating the angular relation between two objects. of an instrument for continuously determining the actual angular relation between the objects and means for superimposing upon the indications of the first named instrument indications of the second instrument, whereby the actual and generated bearings may be compared and any difference between them indicated.

16. In an instrument of the class described, a mechanical vector representing the course and speed of a moving object, a second mechanical vector representing the course and speed of a second moving object, means for generating and indicating range and angular relation of the objects from the mechanical vectors, a part adapted to be moved proportional to the actual range between the objects and a part adapted to be moved proportional to the actual angular relation between the objects, said parts being so arranged that they are superimposed upon the indication of said means, whereby the actual and generated ranges and the actual and generated angular relations may be compared.

17. Apparatus for determining from an observing craft the component speed of a target craft in a given direction, comprising a member adapted to be displaced in accordance with the combined component speeds of the two crafts in the given direction. means for subtracting therefrom the displacement due to the component speed of the observing craft in the given direction, and means movable in accordance with the difference in displacement for indicating the component speed of the target craft.

18. Apparatus for determining from an observing craft the rate of movement of a target craft in a given direction, comprising means adapted to be displaced in accordance with the combined movement of the two crafts in the given direction, means for measuring the rate of said displacement, means for subtracting therefrom the rate of displacement due to the movement of the observing craft in the given direction, and means movable in accordance with the resulting rate of displacement due to the movement of the target craft for indicating its rate of movement in the given direction.

19. Apparatus for determining from an observing craft the rate of movement of a target craft in a given direction, comprising a member movable in accordance with the combined movement of the two crafts in the given direction, a member movable in accordance with the movement of the observing craft in the given direction, a member movable in accordance with the difference between the movements of said members, and means associated with the last named member movable in proportion to the movement of the target craft in the given direction.

20. In an instrument of the class described, a mechanical vector representing the course and speed of a moving object, a second mechanical vector representing the course and speed of a second moving object, a part adapted to be moved proportional to the actual range between the objects, a part adapted to be moved proportional to the actual angular relation between the objects, means for generating and indicating the range and angular relation of the objects from the mechanical vectors and means for comparing the indications of range and angular relation of the objects with the movement of said parts whereby the generated ranges and angular relations may be corrected.

21. In an instrument of the class described, a mechanical vector representing the course and speed of a moving object, a second mechanical vector representing the course and speed of a second moving object, a part adapted to be moved proportional to the actual range between the two objects, means for generating the range between the objects from the mechanical vectors, means for comparing the generated and actual ranges and means for indicating an error in one of the mechanical vectors when the generated and actual ranges differ.

22. In an instrument of the class described a mechanical vector representing the course and speed of a moving object, a second mechanical vector representing the course and speed of a second moving object, a part adapted to be moved proportional to the actual angular relation between the two objects, means for generating the angular relation between the objects from the mechanical vectors, means for comparing the generated and actual angular relations and means for indicating an error in one of the mechanical vectors when the generated and actual angular relations differ.

23. In an instrument of the class described, a mechanical vector representing the course and speed of a moving object, a second mechanical vector representing the course and speed of a second moving object, a part adapted to be moved proportional to the actual range between the two objects, means for generating the range between the objects from the mechanical vectors, means for comparing the generated and actual ranges and a part actuated in accordance with the generated and actual ranges for indicating an error in the range rate component of one of the vectors.

24. In an instrument of the class described, a mechanical vector representing the course and speed of a moving object, a second mechanical vector representing the course and speed of a second moving object, a part adapted to be moved proportional to the actual angular relation between the two objects, means for generating the angular relation between the objects from the mechanical vectors, means for comparing the generated and actual angular relations and a part actuated in accordance with the generated and actual angular relations for indicating an error in the deflection component of one of the vectors.

25. In an instrument of the class described, a mechanical vector representing the course and speed of a moving object, means connected to said vector for generating the angular relations and range between the object and a second object, a pair of comparing devices, means actuated in proportion to the actual range and angular relation between the objects for operating the comparing devices to show when the generated range and angular relation equal the actual range and angular relation and means for operating the comparing devices when the generated range and angular relation differ from the actual range and angular relation in a manner to indicate the required correction in the vector.

26. In an instrument of the class described, a mechanical vector representing the course and speed of a moving object, means connected to said vector for generating the range between the object and a second object, a comparing device, means actuated in proportion to the actual range between the objects for operating the comparing device to show when the generated range equals the actual range and means for operating the comparing device when the generated range differs from the actual range in a manner to indicate the required correction in the vector.

27. In an instrument of the class described, a mechanical vector representing the course and speed of a moving object, means connected to the vector for generating the angular relation between the object and a second object, a comparing device, means actuated in proportion to the actual angular relation between the objects for operating the comparing device to show when the generated angular relation equals the actual angular relation and means for operating the comparing device when the generated angular relation differs from the actual relation to indicate the required correction in the vector.

28. In an instrument of the class described, means for setting up the estimated course and speed of a moving object, means connected to said means for generating the angular relation between the object and another object and means actuated in proportion to the actual angular relation between the objects for indicating an error in the estimated course and speed of the first object.

29. In an instrument of the class described, means for setting up the estimated course and speed of a moving object, means connected to said means for generating the range between the object and another object and means actuated in proportion to the actual range between the objects for indicating an error in the estimated course and speed of the first object.

30. In an instrument of the class described, means for setting up the estimated course and speed of a moving object, means connected to said means for generating the angular relation between the object and another object, means actuated in proportion to the actual angular relation between the objects for indicating a required correction to the estimated course and speed of the first object to cause the generated angular relation to remain the same as the actual angular relation.

31. In an instrument of the class described, means for setting up the estimated course and speed of a moving object, means connected to said means for generating the range between the object and another object, means actuated in proportion to the actual range between the objects for indicating a required correction to the estimated course and speed of the first object to cause the generated range to remain the same as the actual range.

32. In an instrument of the class described, means for setting up the estimated course and speed of a moving object, means for generating the range between the object and another object in accordance with the estimated course and speed and means for comparing the generated range with the actual range for giving an indication of an error in the estimated course and speed when the generated range differs from the actual range.

33. In an instrument of the class described, means for setting up the estimated course and speed of a moving object, means for generating the angular relation between the object and another object in accordance with the estimated course and speed and means for comparing the generated angular relation with the actual angular relation for giving an indication of an error in the estimated course and speed when the generated angular relation differs from the actual angular relation.

34. In an instrument of the class described, means for setting up the estimated course and speed of a moving object, means for generating the angular relation between the object and another object in accordance with the estimated course and speed and means actuated in proportion to the actual range between the objects for giving an indication of an incorrect estimate of the course and speed of the first object.

35. In an instrument of the class described, means for setting up the estimated course and speed of a moving object, means for generating the angular relation between the object and another object in accordance with the estimated course and speed and means actuated in proportion to the actual angular relation between the objects for giving an indication of an incorrect estimate of the course and speed of the first object.

36. The combination with an instrument for continuously generating and indicating the angular relation between two objects, of an instrument for continuously determining the actual angular relation between the objects and means for comparing the indications of said instruments whereby differences between the actual and generated angular relations may be determined.

37. In apparatus for generating the angular relation between two objects with respect to a reference line fixed relatively to one of the objects, the combination of means for generating the angular relation between the objects relative to a reference line that is stationary with respect to the earth and means for automatically altering the generated angular relation by the angular difference between the reference line fixed relatively to one of the objects and the stationary reference line.

38. In apparatus of the class described the combination of a device movable in accordance with the angular relation between the device and a distant object, means remote from the device for generating the angular relation between the device and the distant object, and means for selectively directing the generating means in accordance with the movement of the device and for directing the device in accordance with the generated angular relation.

39. In apparatus of the class described the combination of a device movable in accordance with the angular relation between the device and a distant object, means remote from the device for generating the angular relation between the device and the distant object, and means for directing the device in accordance with the generated angular relation.

HANNIBAL C. FORD.

CERTIFICATE OF CORRECTION.

Patent No. 1,827,812.  Granted October 20, 1931, to

HANNIBAL C. FORD.

It is hereby certified that error appears in the printed specification of the above numbered patent requiring correction as follows: Page 4, line 94, strike out "an idler gear 72 which meshes with gear 71" and insert the same after line 92; page 13, lines 72 and 75, claim 4, and line 111, claim 7, for "bearing" read angular relation; page 15, line 79, claim 25, for "relations" read relation, and line 116, claim 27, before "relation" insert angular; and that the said Letters Patent should be read with these corrections therein that the same may conform to the record of the case in the Patent Office.

Signed and sealed this 8th day of December, A. D. 1931.

(Seal)

M. J. Moore,
Acting Commissioner of Patents.